Figure 1:
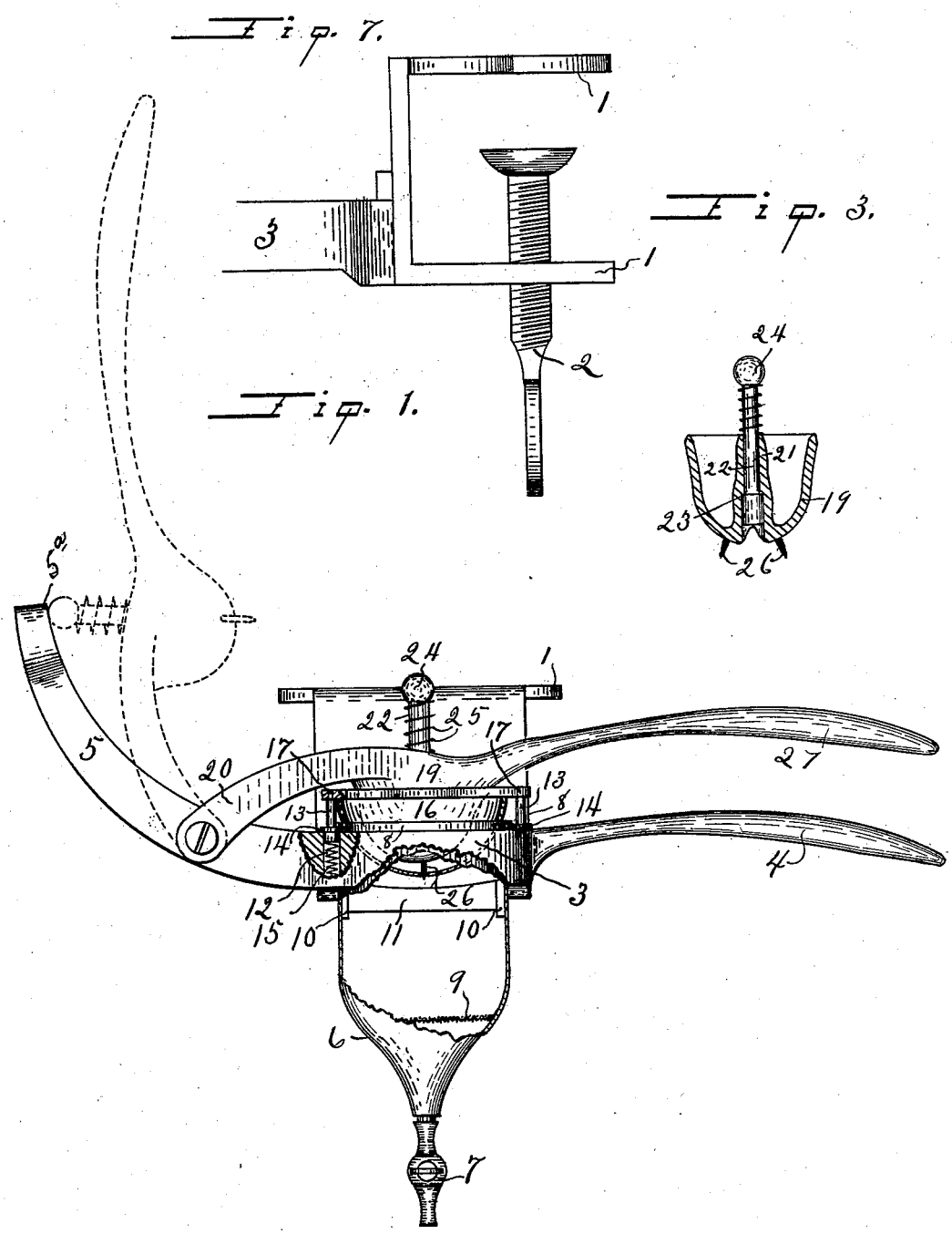

(No Model.) 2 Sheets—Sheet 2.

E. D. MIDDLEKAUFF.
LEMON SQUEEZER.

No. 599,856. Patented Mar. 1, 1898.

Witnesses
Molbry Haynes
L. B. Hodge

Inventor
Ellsworth D. Middlekauff
By Joshua B. Webster
Attorney

UNITED STATES PATENT OFFICE.

ELLSWORTH D. MIDDLEKAUFF, OF SAN FRANCISCO, CALIFORNIA, ASSIGNOR TO CHARLES S. YOUNG, OF SAME PLACE, AND ERAN WILLIAMS, OF EMPIRE CITY, NEVADA.

LEMON-SQUEEZER.

SPECIFICATION forming part of Letters Patent No. 599,856, dated March 1, 1898.

Application filed May 15, 1897. Serial No. 636,801. (No model.)

*To all whom it may concern:*

Be it known that I, ELLSWORTH D. MIDDLEKAUFF, a citizen of the United States, residing in the city and county of San Francisco and State of California, have invented certain new and useful Improvements in Lemon-Squeezers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to lemon-squeezers; and it has for one of its objects to provide a lemon-squeezer embodying a plunger provided with a lemon-engaging device whereby it is enabled to raise a lemon or the debris thereof after the juice is expressed therefrom, so as to permit of such lemon being readily removed from the squeezer.

Another object of the invention is to provide a lemon-squeezer embodying a plunger provided with a lemon-engaging device whereby it is enabled to raise a lemon or the debris thereof after the juice is expressed therefrom, and a suitable means for automatically removing the lemon from the plunger when said plunger is raised.

Another object of the invention is to provide a lemon-squeezer embodying a plunger provided with a lemon-engaging device whereby it is enabled to raise a lemon or the debris thereof after the juice is expressed therefrom, a stop, and a lemon-remover adapted to be engaged and moved by the stop when the plunger is raised and thereby remove the lemon debris from the plunger; and another object of the invention is to provide a lemon-squeezer embodying a knife, a lemon-receiver yieldingly supported above the knife and movable with respect to the same, and a plunger for squeezing the lemon against the receiver and for moving said receiver toward the knife, so as to carry the lemon into contact with the knife and cut said lemon, thus permitting of the lemon being placed between the plunger and receiver while intact and avoiding the necessity of the operator handling the lemon after it is cut and prior to its being subjected to pressure.

The invention further contemplates constructing and connecting the parts of the device in such a manner that they may be readily separated to facilitate cleansing thereof, and it will be fully understood from the following description and claims when taken in conjunction with the accompanying drawings, in which—

Figure 2:
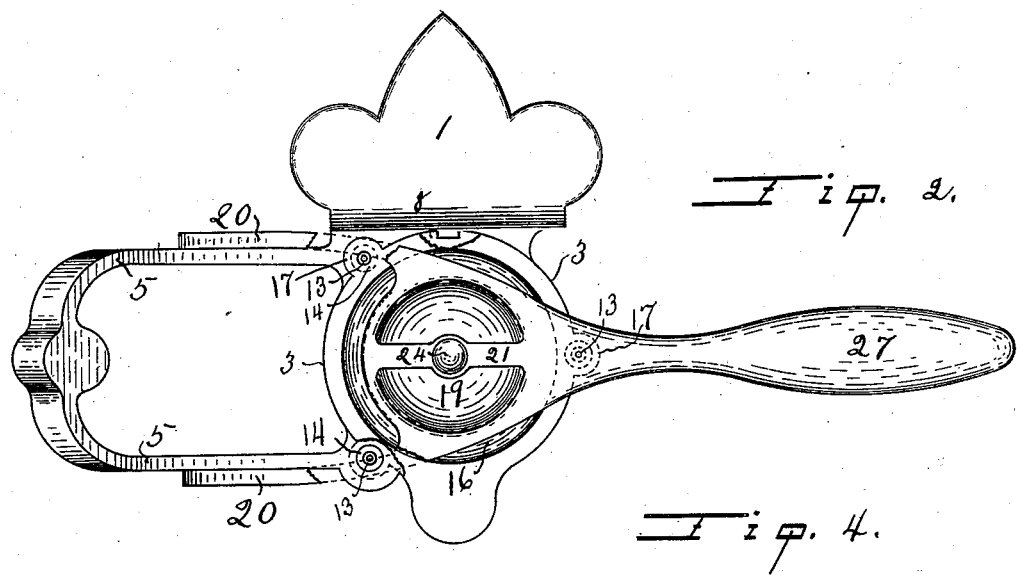
Figure 4:
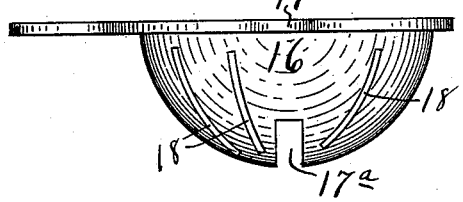
Figure 5:
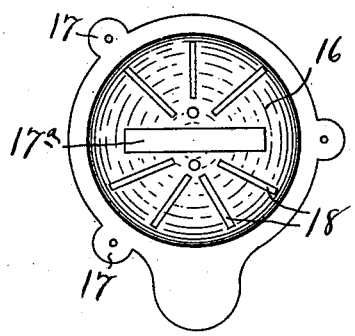
Figure 6:
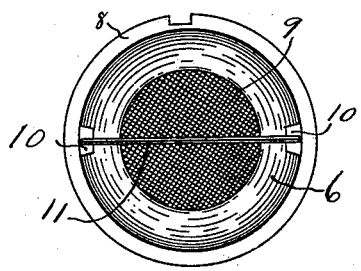

Figure 1 is a side elevation of my improved lemon-squeezer with parts broken away and the plunger shown in its raised position by dotted lines. Fig. 2 is a plan view of the squeezer. Fig. 3 is a detail transverse section of the plunger. Fig. 4 is a side elevation of the lemon-receiver. Fig. 5 is a plan view of the same. Fig. 6 is a plan view of the juice-receptacle; and Fig. 7 is a side elevation of the clamp, which preferably forms a part of my improved squeezer when the same is to be adapted for connection to a table, counter, or the like.

In the said drawings similar numerals designate corresponding parts in all of the several views, referring to which—

3 indicates a suitable support, preferably a ring, which is designed in the preferred embodiment of the invention to be connected with a table or counter by a clamp 1, having a binding-screw 2, as better shown in Fig. 7. This ring 3 is provided with a handle 4 and also with arms 5, which terminate in a stop 5ª, and it is designed to receive and support a removable juice-receptacle 6, said receptacle being provided with a flange 8, which bears on the upper edge of the ring, as shown. The receptacle 6 is provided with a gauze or foraminated diaphragm 9 for the purpose of straining the lemon-juice and catching and retaining the seeds, and it is also preferably provided at the terminal of its lower funnel-shaped portion with a suitable cock 7. Interiorly the receptacle 6 is provided with diametrically opposite lugs 10, having notches in their upper ends, and in these notches are removably seated the ends of a knife 11, which has its cutting edge uppermost and is designed to cut the lemons, as will be presently described.

16 indicates the lemon-receiver, which is preferably cup-shaped, as shown, and is provided with a slot 17ª in its bottom to enable the knife 11 to engage the lemon, as presently described, and is also preferably provided with a plurality of apertures 18 to permit a free passage of the expressed juice to the receptacle 6. This receiver 16 is yieldingly supported above the knife 11, being preferably provided with lugs 17, which bear on pins 13, arranged upon springs 15 of the ring 3, as shown. The said pins 13 have heads or enlargements at their lower ends and are prevented from being withdrawn from the sockets 12 by collar-flanges 14, which surround the pins and are fixedly connected to the upper side of the ring 3. The lemon-receiver 16, however, is removably mounted on the pins 13, so as to permit of its ready removal and also the ready removal of the juice-receptacle 6 when the squeezer is to be cleaned.

19 indicates the plunger of the squeezer, which is carried by a lever 20, fulcrumed on the arms 5 of the ring 3, and is provided with a handle 27, disposed above the handle 4, as shown. This plunger 19 is shaped in conformity to the interior of the lemon-receiver 16, and it is provided with a lemon-engaging device, preferably one or more barbs 26, the purpose of which is to hold the lemon, so as to enable the plunger to raise the lemon or the debris thereof after the juice has been expressed therefrom. The said plunger 19 is further provided with an interior bridge 21, having a central bore, as shown, in which is arranged the lemon-remover 22, which is in the form of a rod and has the enlargement 23 to bear against an interior shoulder of the bore and is normally held in the position shown in Fig. 3 by a coiled spring 23ª, which is interposed between the bridge 21 and an enlargement 24 at the upper end of the rod, as shown. The said lemon-remover 22 is designed, when the plunger is raised to the position shown by dotted lines in Fig. 1, to engage the stop 5ª. This will push the remover endwise toward the right, and in consequence it will push the lemon or the lemon debris off the plunger.

In the practical operation of the squeezer the lemon is placed intact in the receiver 16, while the plunger is in the raised position shown by the dotted lines in Fig. 1. The plunger is then lowered to the position shown by full lines in Fig. 1 and is forced downwardly by reason of the operator grasping the handles 27 and 4. When the plunger 19 is so forced downwardly, the yieldingly-supported lemon-receiver 16 will also be forced downwardly and the lemon will be pressed against the knife, which will cut it. With this done the continued downward pressure of the plunger 19 will quickly express all the juice from the lemon, and such juice will pass into the juice-receptacle 6 or through the same into a glass in the event of the cock 7 being open. After the juice is entirely expressed from the lemon the plunger is thrown up into the position shown by dotted lines in Fig. 1, when the lemon-remover 22, being engaged and moved toward the right by the stop 5ª, will push the lemon or lemon debris off the plunger. From this it will be seen that the hand of the operator does not come in contact with the lemon except when he places the whole uncut lemon in the receiver 16, and that therefore the operation of extracting the juice from one or a number of lemons may be conducted without danger of soiling the person of the operator and without danger of foreign substance finding its way into the juice. It will also be seen that the parts of my improved squeezer are readily separable, and that consequently it may be very easily cleaned when desired.

Having thus described my invention, what I claim is—

1. In a lemon-squeezer, a receiver and a plunger provided with a lemon-engaging device whereby said plunger is enabled to raise a lemon from the receiver after the juice is expressed therefrom, substantially as specified.

2. In a lemon-squeezer, a receiver, a plunger provided with one or more barbs whereby the plunger is enabled to raise the lemon from the receiver after the juice is expressed therefrom, substantially as specified.

3. In a lemon-squeezer, the combination of a lemon-receiver, a plunger provided with a lemon-engaging device whereby said plunger is enabled to raise a lemon from the receiver after the lemon is pressed between the plunger and receiver and the juice is expressed therefrom, and a lemon-remover operative by the upward movement of the plunger for removing the lemon from the plunger, substantially as specified.

4. In a lemon-squeezer, the combination of a stop, a plunger provided with a lemon-engaging device whereby said plunger is enabled to raise a lemon after the juice is expressed therefrom, and a lemon-remover carried by the plunger and adapted to be engaged and moved by the stop when the plunger is raised and thereby remove the lemon from the plunger, substantially as specified.

5. In a lemon-squeezer, the combination of a stop, a plunger provided with one or more barbs for holding a lemon whereby said plunger is enabled to raise a lemon after the juice is expressed therefrom, and the spring-pressed lemon-remover carried by the plunger and adapted to be engaged and moved by the stop when the plunger is raised and thereby remove the lemon from the plunger, substantially as specified.

6. In a lemon-squeezer, the combination of a lemon-receiver having a handle, a stop, a lever-plunger provided with one or more barbs for holding a lemon whereby said lever-plunger is enabled to raise a lemon from the receiver after the juice is expressed therefrom, and the spring-pressed lemon-remover carried by said lever-plunger and adapted to be engaged and moved by the stop when the lever-plunger is raised and thereby remove the lemon from the plunger, substantially as specified.

7. In a lemon-squeezer, the combination of a knife, a lemon-receiver yieldingly supported above and movable with respect to the knife and having an opening in its bottom, and a plunger for squeezing a lemon against the receiver and for moving said receiver toward the knife so as to carry the lemon into contact with the knife, substantially as specified.

8. In a lemon-squeezer, the combination with a vertically-movable lemon-receiver, a fixed knife below the same, and a plunger for moving the receiver so as to bring the lemon in contact with the knife and squeeze the lemon, substantially as specified.

9. In a lemon-squeezer, the combination of a ring having a handle, a lemon-juice receptacle arranged in said ring and having a flange bearing on the upper edge of said ring and also having diametrically opposite, notched lugs on its inner side, a knife arranged in said lugs within the juice-receptacle, a removable lemon-receiver yieldingly supported on the ring and depending into the juice-receptacle and having an opening in its bottom, and a lever-plunger for squeezing a lemon against the receiver and for moving said receiver toward the knife so as to carry the lemon into contact with the knife, substantially as specified.

10. In a lemon-squeezer, the combination of a ring having a handle and also having the arms 5, terminating in the stop 5ª, a lemon-juice receptacle removably placed in said ring and having a flange bearing on the upper edge of said ring and also having diametrically opposite, notched lugs on its inner side, a removable knife arranged in said lugs, a removable lemon-receiver yieldingly supported on the ring and depending into the juice-receptacle and having an opening in its bottom, a lever-plunger for squeezing a lemon against the receiver and for moving said receiver toward the knife so as to carry the lemon into contact with the knife; said plunger having arms pivotally connected to the arms 5, and also having a handle disposed above the handle of the ring, and a spring-pressed lemon-remover adapted to engage and be operated by the stop when the plunger is raised, substantially as specified.

11. In a lemon-squeezer, the combination of a supporting-ring, a lemon-juice receptacle arranged in and supported by the ring, a removable knife arranged in said receptacle, a removable lemon-receiver yieldingly supported upon the ring and depending into the lemon-juice receptacle and having an opening in its bottom and a plunger for pressing a lemon against the receiver and for pressing said receiver downwardly so as to carry the lemon against the knife, substantially as specified.

12. In a lemon-squeezer, the combination of a knife, a lemon-receiver disposed above and movable with respect to the knife and having an opening in its bottom, and a plunger for squeezing a lemon against the receiver and for moving said receiver toward the knife so as to carry the lemon into contact with the knife, substantially as specified.

In testimony whereof I affix my signature in presence of two witnesses.

ELLSWORTH D. MIDDLEKAUFF.

Witnesses:
NELSON M. ANDERSON,
M. HAYNES.